June 2, 1959 — D. W. HAGLUND — 2,889,138
ROCK DRILL CUTTING INSERT
Filed July 6, 1955
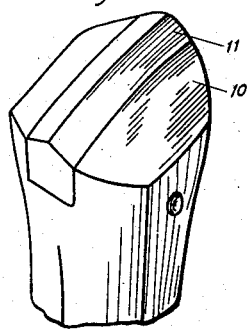
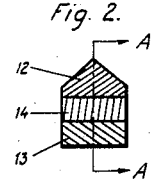
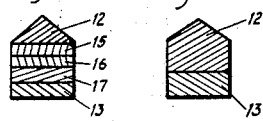
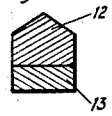
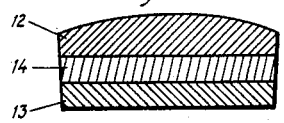
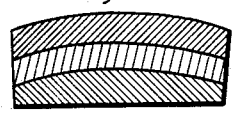
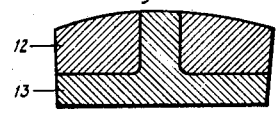

2,889,138
ROCK DRILL CUTTING INSERT

Didrik Wilhelm Haglund, Sandviken, Sweden, assignor to Sandvikens Jernverks Aktiebolag, Sandviken, Sweden, a corporation of Sweden Application July 6, 1955, Serial No. 520,308

7 Claims. (Cl. 255—64)

This invention relates to a rock drill cutting insert which consists of two or more layers of hard metal, the upper part with the cutting edge being relatively fine-grained while the lower part consists of more coarse-grained hard metal.

By "hard metal" is meant a sintered alloy consisting essentially of one or more carbides and/or other hard materials, for instance tungsten carbide, combined with one or more bonding metals such as cobalt or other metals in iron group.

Rock drill cutting inserts should have a high resistance to wear and also a high resistance to breaking or crumbling when subjected to the great shock strains which are applied during boring with modern percussion drilling machines.

However, it is very difficult to combine these two qualities in a cutting insert of homogeneous grain size and chemical composition. Thus, if hardness and resistance to wear are increased, the cutting insert becomes more brittle and tends to break or crumble more readily and conversely, if the tenacity and mechanical strength is increased, the resistance to wear is reduced.

It has been proposed to produce hard metal cutting inserts with zones extending perpendicular to the cutting face which are of different resistance to wear. The more wear resistant material generally has been placed at the ends of the cutting insert at the periphery of the drill bit or in one or more relatively thin zones arranged parallel with the side surfaces of the cutting insert.

It is known that the more wear resistant material usually has a lower content of bonding metal than the less wear resistant material. It is also known that a difference in resistance to wear may be determined by choice of the carbides used as well as by choice of grain size.

The cutting insert of the present invention affords several important advantages in comparison with those known heretofore. Some of these advantages will be mentioned in the following description.

The mechanical strength of a rock drill cutting insert decreases as its height is decreased by wear until finally it cannot resist the bending strains to which it is subjected and breaks. A relatively hard cutting insert wears down more slowly than a tougher insert but on the other hand it cannot be worn down as far as can a tougher insert before breaking.

The advantages of the above mentioned two types of cutting inserts are utilized in the same cutting insert in accordance with the invention. This is accomplished by a variation in grain size in the cutting insert while the content of bonding metal, for example cobalt, is maintained substantially the same in the different parts of the cutting insert or is made somewhat higher in the more fine grained part of the insert than in the more coarse-grained part. A simultaneous variation of both grain size, i.e. the grain size of the hard material, and in the content of bonding metal is possible in certain cases.

According to the invention the upper part of the cutting insert including the edge consists of fine-grained hard metal and the lower part of coarse-grained hard metal. The fine-grained material has a greater resistance to wear and greater hardness than the coarse-grained material, which, however, has a greater toughness. Thus, the more wear resisting part of the insert will be used first when the insert height is relatively high. As the insert wears away the ratio of the coarse-grained tougher part of the insert to the fine-grained more fragile part increases and it has been found that this relationship gives an improved utilization of the insert i.e. the qualities of high wear resistance are combined with the qualities of toughness so that the insert has a longer life with respect to both wear and breakage.

The boundary between the course-grained part and the fine-grained part of the insert may be a plane surface parallel to the bottom surface of the insert or this boundary surface may be curved either toward or away from said bottom surface or may be given other suitable shapes to strengthen the bond between the layers.

The invention will be further described in connection with the accompanying drawings, which shows several illustrative embodiments of the invention.

Fig. 1 is a perspective view of a drill bit with a hard metal cutting insert, and Figs. 2, 3, 4, 5, 6, and 7 are cross sections of inserts showing different arrangements of the coarse-grained and fine-grained portions.

In the drill bit 10 shown in Fig. 1 a hard metal cutting insert 11 is secured in a groove in the drill bit body by brazing or in any other suitable way. This represents merely a typical arrangement. Within the scope of my invention the insert may vary in shape, more than one insert may be provided in the cutting face of the drill bit and various arrangements of the inserts in the drill bit face may be used. For example four inserts may be arranged in the form of a cross and/or the insert or inserts may be formed of two or more pieces or the insert may have converging side surfaces in boring direction.

Figs. 2–4, which show sections perpendicular to the long axis of each cutting insert, are examples of different arrangements of the different hard metal layers. In Fig. 4, which is the simplest embodiment, 12 is the fine-grained, more wear resistant layer and 13 is the coarse-grained, tougher layer. The embodiments shown in Fig. 2 have a third layer 14 of intermediate toughness and according to Fig. 3 layers 15, 16 and 17 of progressively increasing grain size are interposed between the more wear resistant layer 12 and the tougher layer 13. It is possible further to increase the number of the layers or to provide a substantially continuously increasing grain size toward the bottom of the cutting insert or to combine a layer or layers having a certain grain size with a layer or layers having a continuously varying grain size. For example a wear resistant layer of uniform composition may be combined with a layer having a continuously increasing toughness.

By choosing suitable grain sizes for the different layers the desired qualities for the cutting insert are obtained. Great resistance to wear may be provided in the upper part of the cutting insert and a satisfactory toughness in the lower part. The chemical analysis may be substantially uniform in the whole insert or the change in grain size in the different layers may be accompanied by a variation in chemical composition. Thus the content of bonding metal may be somewhat higher in the more fine-grained, more wear resistant layer than in the more coarse-grained and tougher layer. As a rule the bonding metal content, preferably cobalt content for each of the layers is chosen between 6 and 9%.

In order to obtain the best properties for the inserts according to the invention the mean grain sizes for the different layers should be chosen within certain boundaries. Thus the mean grain size for the fine-grained hard metal should preferably be chosen between 1 micron and a value determined by mean grain size=7-0.5 (bonding metal percent) microns and the mean grain size for the coarse-grained hard metal should be at least 0.25 micron larger than for the fine-grained hard metal and at the same time preferably chosen between a value determined by mean grain size=6.5-0.5 (bonding metal percent) microns and 5 microns.

Thus the upper limit of particle size for the fine-grained hard metal and the lower limit of particle size for the coarse-grained hard metal should be chosen in dependence of the bonding metal content, which may be the same in the different hard metal layers or higher in the more fine grained layers than in the more coarse grained.

As an illustrative example the hard metal may have a composition within the analysis limits from 91 to 94% WC and from 6 to 9% Co and the more wear resistant layer may have a grain size between 1 and 2.5 microns while the tougher layer has a grain size of from 3 to 5 microns. In making such an insert successive layers of the fine-grained and coarser-grained hard metal alloy, containing for example 8% of cobalt are deposited in a mold and pressed. After final pressing together the cutting insert is sintered in the usual manner.

According to another example the hard metal contained about 93% WC and about 7% Co, the grain size for the more wear resistant layer was about 1 to 2 microns and for the tougher layer about 4 to 5 microns and the more wear resistant layer contained a higher cobalt content than the tougher layer as a result of cobalt migration. The composition of the hard metal and the grain sizes of the layers must naturally be chosen with regard to the character of the rock which is to be drilled.

According to a further example the grain size for the more wear resistant layer was about 2.4 microns and for the tougher layer about 3.6 microns and the more wear resistant layer contained 7.5% Co and 92.5% WC and the tougher layer 7.0% Co and 93% WC.

The cutting insert consists of a unit sintered together and the boundary between the layers may be sharp or it may show a more or less continuous transition. The boundary may, as stated above, be substantially plane and parallel with the bottom of the insert as shown in Fig. 5, or it may be curved as shown in Fig. 6 or it may be of angular or polygonal shape. The hard metal, divided into superposed layers, may also be divided into two or more zones lengthwise of the cutting insert and a tougher hard metal may be positioned between said zones. Since the first worn parts of the cutting insert are the corners, it may be worthwhile to provide these areas with the more wear resistant hard metal. The tougher hard metal may occupy both positions described above i.e. it may form the lower layer and also extend between longitudinal zones of the harder layer as shown in Fig. 7.

In comparison with cutting inserts used heretofore the inserts according to the present invention give essentially better efficiency on account of the fact that they may be worn down to a substantially thinner dimension which, together with the fact that the upper layer is more wear resistant, gives a greatly increased amount of boring before the drill bit has to be discarded.

I claim:
1. A rock drill cutting insert consisting essentially of hard metal carbide grains and from 6 to 9% of a bonding metal, said insert having a cutting edge surface and an oppositely disposed substantially plane bottom surface and consisting of at least two layers lying substantially parallel to said bottom surface, the mean grain size of said hard metal carbide increasing and the wear resistance decreasing from layer to layer in the direction from said cutting edge surface to said bottom surface, and the bonding metal content in a finer grained layer being at least equal to that in a coarser grained layer, the hard metal carbide in the layer adjacent to the cutting edge surface having a mean grain size within the range from 1 micron to [7-0.5 (bonding metal percent)] microns and the hard metal carbide in the next adjacent layer having a mean grain size within the range from [6.5-0.5 (bonding metal percent)] microns to 5 microns and the difference in the mean grain size of the grains of hard metal carbide in said adjacent layers being at least 0.25 micron and the boundary between each pair of adjacent layers lying substantially in a plane parallel to said bottom surface.

2. A rock drill cutting insert as defined in claim 1 in which the layer adjacent the cutting edge surface is divided into two parallel zones separated by a projection of the adjacent layer.

3. A rock drill cutting insert as defined in claim 1 in which said layers have substantially the same chemical composition.

4. A rock drill cutting insert as defined in claim 1 in which the layer adjacent to the cutting edge surface contains a greater proportion of bonding metal than the next adjacent layer.

5. A rock drill cutting insert as defined in claim 1 comprising several layers of progressively increasing grain size in the direction from the cutting edge surface toward the bottom surface.

6. A rock drill cutting insert as defined in claim 1 having three layers.

7. A sintered rock drill cutting insert consisting essentially of from 91 to 94% tungsten carbide grains bonded together by from 6 to 9% cobalt, said insert having a cutting edge surface and an oppositely disposed substantially plane bottom surface and consisting of a top layer including the cutting edge surface and a bottom layer including the bottom surface, said layers lying substantially parallel to said bottom surface and the boundary between the layers lying substantially in a plane parallel to said bottom surface, the top layer having a greater wear resistance than the bottom layer and the bottom layer a greater toughness than the top layer, the mean grain size of the top layer being between 1 and 2.5 microns and the mean grain size of the bottom layer being between 3 and 5 microns.

References Cited in the file of this patent

UNITED STATES PATENTS

| | | |
|---|---|---|
| 2,066,853 | Rea | Jan. 5, 1937 |
| 2,582,231 | Catallo | Jan. 15, 1952 |
| 2,751,195 | Edstrom et al. | June 19, 1956 |

FOREIGN PATENTS

| | | |
|---|---|---|
| 634,743 | Great Britain | Mar. 29, 1950 |
| 683,018 | Great Britain | Nov. 19, 1952 |
| 683,194 | Great Britain | Nov. 26, 1952 |